United States Patent [19]

McCabe

[11] Patent Number: 4,511,277

[45] Date of Patent: Apr. 16, 1985

[54] BALL JOINTS AND LINERS THEREFOR

[75] Inventor: Graham McCabe, Witham, England

[73] Assignee: Ford Motor Company, Dearborn, Mich.

[21] Appl. No.: 282,986

[22] Filed: Jul. 14, 1981

[51] Int. Cl.³ .............................................. F16C 11/06
[52] U.S. Cl. .................................. 403/140; 384/203; 403/122
[58] Field of Search ............... 403/135, 140, 138, 133, 403/122, 136, 137; 308/72; 384/203

[56] References Cited

U.S. PATENT DOCUMENTS

| | | | |
|---|---|---|---|
| 3,004,786 | 10/1961 | Herbenar | 403/140 |
| 3,160,430 | 12/1964 | Gottschald | 403/140 |
| 3,226,141 | 12/1965 | Sullivan | 403/135 |
| 3,530,495 | 9/1970 | Kindel | 403/140 |
| 4,318,627 | 3/1982 | Morin | 403/133 |

Primary Examiner—Cornelius J. Husar
Assistant Examiner—Joseph A. Fischetti
Attorney, Agent, or Firm—Jerome R. Drouillard; Roger L. May

[57] ABSTRACT

A liner for a ball joint in, for example, a gear selector lever, comprises an annulus (10) of plastics material having a spherical inner bearing surface (12) for engaging a ball element (1) and an outer surface (11) for mounting in a recess in a housing. One, and preferably each, end of the annulus is axially slotted (15) to form tongues (16a,b) which can be deflected radially to dilate the end of the annulus, allowing the ball element (1) to be inserted. Some tongues (16a) having a spherical inner surface (17a) forming part of the bearing surface (12), others carry radial projections (18) on their outer surfaces for engaging a radial cavity in the housing recess to retain the ball element (5) therein. The internal surface of those tongues (16b) is spaced from the spherical bearing surface to allow the assembled ball element (5) and liner (10) to be pushed into the recess.

10 Claims, 5 Drawing Figures

BALL JOINTS AND LINERS THEREFOR

DESCRIPTION

This invention relates to liners for ball joints, and ball joints including such liners.

A conventional ball joint, such as used to mount a gear selector lever on a gearbox, comprises a housing having a recess therein, which is usually cylindrical, a ball element pivotably received in the recess, and a bearing liner between the ball element and the recess.

One known kind of liner as, for example disclosed in British Patent Specification No. 1,187,187, comprises an annulus of resiliently deformable plastics material having an inner spherical bearing surface. In order to allow the liner to be pushed on to the ball element, at least one end portion of the annulus has a plurality of axially extending circumferentially spaced tongues. These tongues spread radially outwardly to dilate the end of the annulus as the ball element is inserted into the annulus.

In order to keep the ball element and liner in the housing, a retainer, such as a spring circlip or a nut is secured to the housing in contact with the liner. In the case of a gear selector lever, if a nut is used as a retainer, it is normally positioned above the ball element, where it limits the range of movement of the lever. If a circlip is used, it is usually necessary to insert shims into the housing to compensate for variations in size of the ball element and the recess due to manufacturing tolerances. Assembly of the joint is therefore relatively complicated.

According to the present invention, there is provided a liner for a ball joint comprising an annulus of resiliently deformable plastics material having an inner spherical bearing surface, at least one end portion of the annulus having a plurality of axially extending circumferentially spaced tongues which can be deflected radially to dilate the end of the annulus characterised in that at least some of the tongues have inner surfaces which lie in the spherical bearing surface, and at least one of the tongues has a radially outwardly extending projection for retaining the liner in a bearing mounting, and an inner surface which is spaced radially outwardly from the spherical bearing surface.

In use, the liner is mounted on the ball element of a ball joint with its spherical surface in sliding contact with a spherical surface of the ball element, the tongues undergoing radial deflection to dilate the end of the annulus as the ball element is inserted therein. The assembled ball element and annulus can then be mounted in a housing provided with a recess for receiving the ball element and liner, the liner being retained in the recess by engagement of the or each projection with a radial cavity, for example a circumferential groove, in the recess. Since the or each tongue of the annulus carrying the radial projections has an inner surface spaced radially from the spherical bearing surface of the annulus, and therefore of the ball element, the tongues can be deflected radially inwardly thereby allowing the radial projections to be inserted into the recess in the housing.

In order to facilitate insertion of the annulus into the recess, the or each projection preferably has a radially outer surface which is inclined at an acute angle to the external surface of the liner in a direction away from the axis of the annulus and towards the central radial plane thereof. As a result, the engagement of the projection with the mouth of the recess exerts a radially inward force on the tongues. In addition, the projection preferably has another part of its surface inclined in the opposite direction so that the projections are wedge-shaped in axial cross section. This ensures positive engagement of the projections in the cavity of the recess even when the relative radial and axial positions of the inner and cavity vary within manufacturing tolerances.

Preferably the other end portion of the annulus also has a plurality of axially extending circumferentially spaced tongues the inner surfaces of which lie in the spherical bearing surface of the annulus. This construction permits the ball element to be introduced into the annulus from either end. With such a construction, the tongues are preferably so disposed relative to each other that dilation of one end of the annulus produces a contraction in the other end of the annulus. For example, the tongues may be formed by slots in the annulus extending axially from the ends of the annulus, the slots at each end preferably being circumferentially interleaved to avoid weakening the annulus at its central radial plane. With such a construction, insertion of the one end of the annulus into the recess is facilitated by dilating the other end of the annulus by partially inserting the ball element. The liner can also preferably expand radially, thus accommodating variations in size of the ball element within manufacturing tolerances.

In order that the invention may be better understood, a preferred embodiment thereof will now be described, by way of example only, with reference to the accompanying drawings, in which.

Figure 1:
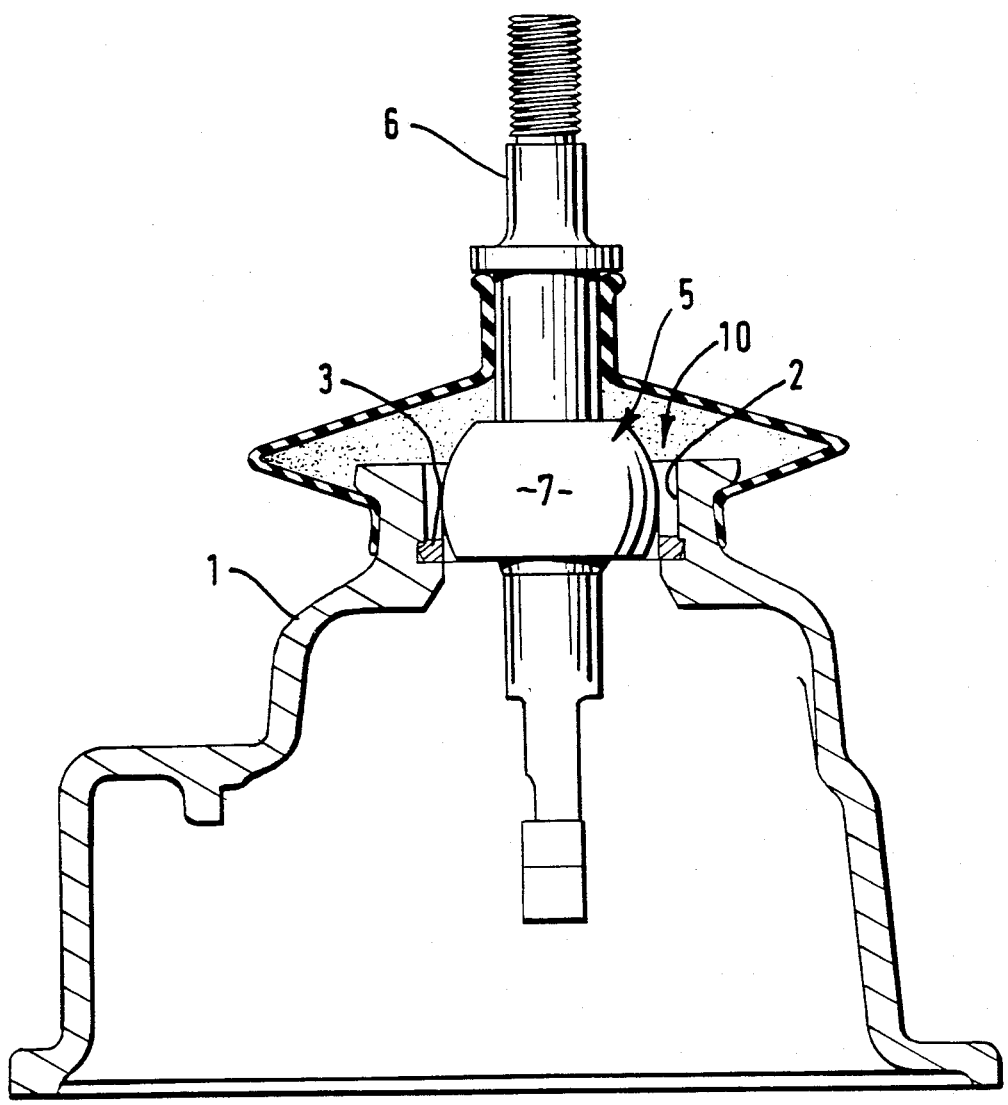
FIG. 1 is a cross-section through a ball joint incorporating a liner in accordance with the invention.

Referring to the drawings, a gear selector lever assembly for a gearbox comprises a housing 1 having a cylindrical recess 2 the internal surface of which includes a radial cavity in the form of a circumferential groove 3.

Figure 2:
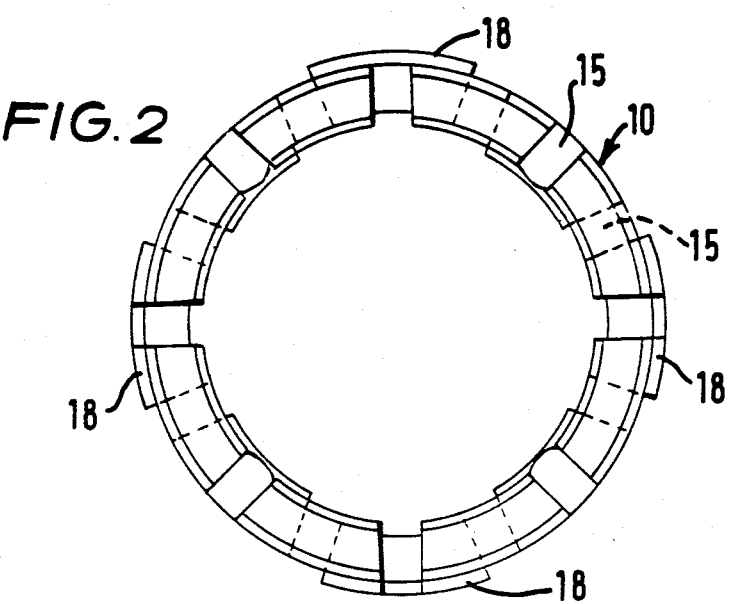
FIG. 2 is an end view on an enlarged scale of a liner incorporated in the ball joint of FIG. 1.
Figure 3:
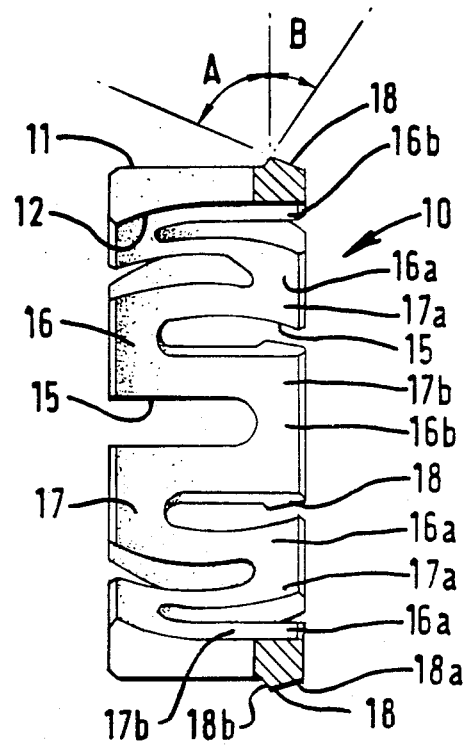
FIG. 3 is an axial cross-section of the liner of FIG. 2.

A ball element 5 of sintered metal press fitted on to a selector lever 6 is received in the recess 2. The ball element 5 has a spherical surface 7 of smaller diameter than the recess 5, and is retained in the recess by a liner 10, illustrated in detail in FIGS. 2 and 3.

The liner 10 comprises a one-piece moulding of resiliently deformable plastics material, such as a self-lubricating acetal copolymer of the kind conventionally used as a bearing liner material. The liner 10 is an annulus having a generally cylindrical external surface 11 which is a sliding fit with the recess 2. The internal surface 12 of the liner defines a spherical bearing surface of complementary diameter to that of the spherical surface 7 of the ball element 5 so that the spherical surface 7 of the ball element 5 can make a sliding contact therewith.

Each end of the liner 10 is provided with eight axial slots 15. The slots 15 at each end extend beyond the central radial plane of the liner 10 and are interleaved circumferentially with the slots at the opposite end so that the annulus has a sinuous shape which is both flexible and strong.

Figure 4:
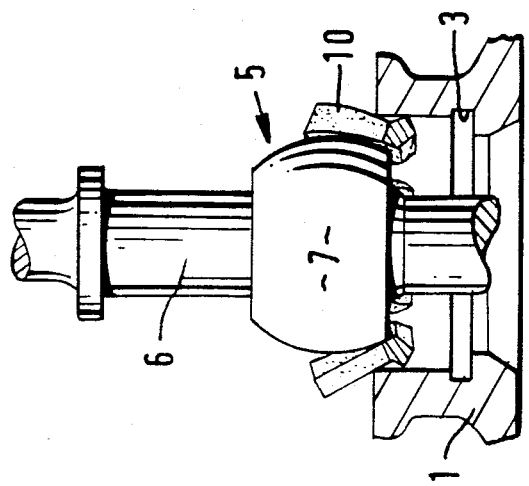
FIG. 4 is a cross-section on an enlarged scale through part of the ball joint of FIG. 1 during a first stage of assembly.

Adjacent pairs of slots divide the end portions of the annulus into eight circumferentially spaced tongues 16, 16a, 16b. The tongues at either end of the liner 10 can be deflected radially outwardly to dilate the end of the liner 10, a dilation at one end being accompanied by a contraction at the other end of the annulus. This allows the ball element 5 to be inserted into either end of the annulus as illustrated in FIG. 4.

All the tongues 16 at one end of the annulus have an inner surface 17 which lies in the spherical bearing surface 12 of the liner 10. At the other end of the annulus however, only four of the tongues 16a have inner surfaces 17a lying in the bearing surface of the liner. The other four tongues, 16b have inner surfaces 17b which are spaced radially from the spherical bearing surface 12 of the annulus 10, and which lie in a cylindrical surface parallel to the external surface 11 of the annulus 10 and tangential to the bearing surface 12 at the central radial plane of the liner 10. These four tongues 16b are also provided with radially outwardly extending projections 18. Each projection is generally wedge-shaped in axial cross-section having a leading radially outer conical surface 18a which is inclined outwardly at an angle A to the radial plane away from the central axis of the liner and towards the central plane thereof, and a trailing outer conical surface 18b which is inclined in the opposite direction at a smaller angle, B, to the radial plane. The bases of these projections are axially wider than the groove 3 so that the extremities of the projections engage in the circumferential groove 3 and retaining the liner 10 and the ball element 5 in the recess 2.

In order to assemble the joint, the ball element 5 is partially inserted into the end of the annulus opposite the projections 18, thus dilating the end into which it is inserted and contracting the opposite end. The contracted end of the annulus can then easily be introduced into the mouth of the recess 3, as illustrated in FIG. 4. The wedge shapes of the projections 18 facilitate this movement.

Figure 5:
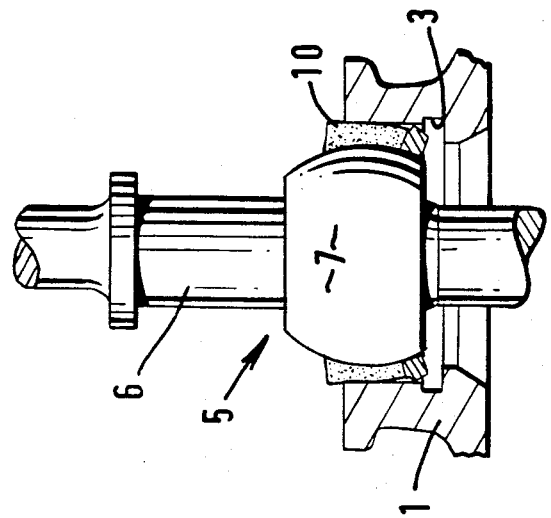
FIG. 5 is a similar cross-section to FIG. 4 showing the ball joint during a later stage of assembly.

The ball element 5 is then pushed firmly into the liner 10 so that its spherical surface 7 lies in contact with the bearing surface 12 of the liner. This movement causes the dilated end of the liner 10 to return to its normal size, allowing the liner to slide into the recess 3. Since the four tongues 16b carrying the projections 18 have inner surfaces spaced from the spherical bearing surface 12 of the liner 10, the engagement of the projections 18 with the cylindrical internal surface of the recess 2 deflects the tongues 16b radially inwardly, so that the projections 18 are accommodated within the recess 2, as illustrated in FIG. 5. Since the slots 15 allow radial expansion of the liner 10, variations in size of the ball element 5 due to manufacturing tolerances can be accommodated.

Further movement of the liner 10 and ball 5 into the recess brings the projections into registry with the groove 3, whereupon the tongues 16b expand radially outwardly to retain the liner in position. Since the projections 18 are wedge shaped, in axial cross-section, with their faces inclined at acute angles in opposite directions to the central radial plane, the projections will engage in the groove 3 regardless of small variations in the relative positions of the groove 3 and liner 10 due to manufacturing tolerances.

No further fixing of the selector lever 6 to the housing 1 is required, so that the movement of the lever 6 relative to the housing 1 is unencumbered by retainers such as nuts. Moreover, the use of a flexible liner 10 with wedge-shaped retaining projections 18 accommodates variations in size of the recess 2 in the housing and of the ball element 5 within manufacturing tolerances, thereby avoiding the need for shims or other spacers. Indeed variations within relatively large tolerances can be accommodated, which allows the components of the assembly to be manufactured by cheaper methods. For example, the ball element 5 may be of sintered metal.

I claim:

1. A liner for a ball joint comprising an annulus of resiliently deformable plastics material having an inner spherical bearing surface, at least one end portion of the annulus having a plurality of axially extending circumferentially spaced tongues which can be deflected radially to dilate the end of the annulus, characterised in that at least some of the tongues have inner surfaces which lie in the spherical bearing surface, and at least one other tongue which has a radially outwardly extending projection for retaining the liner in a bearing mounting and an inner surface which is spaced radially outwardly from the spherical bearing surface.

2. A liner according to claim 1 wherein the projection has part of its radially outer surface inclined at an acute angle to the external surface of the liner in a direction away from the axis of the annulus and towards the central plane thereof.

3. A liner according to claim 2, wherein the projection has another part of its radially outer surface inclined in the opposite direction such that said projection is wedged-shaped in axial cross-section.

4. A liner according to claim 1, 2 or 3 wherein the other end portion of the annulus has a plurality of axially extending circumferentially spaced tongues the inner surfaces of which lie in the spherical bearing surface.

5. A liner according to claim 4 wherein the tongues on each end portion are so disposed relative to each other that dilation of one end of the annulus produces a contraction in the other end of the annulus.

6. A ball joint comprising
a housing having an internal surface defining a recess for receiving a liner,
a liner disposed within said housing and comprising an annulus of resiliently deformable plastics material having an inner spherical bearing surface, at least one end portion of the annulus having a plurality of axially extending circumferentially spaced tongues which can be deflected radially to dilate the end of said annulus, and
a ball element disposed within said liner in sliding contact with said spherical bearing surface of said liner,
said ball joint being characterized in that:
(i) at least some of said tongues of said annulus have inner surfaces which lie in said spherical bearing surface;
(ii) said recess of said housing has a radial cavity therein; and
(iii) at least one other tongue
(a) which has an inner surface which is spaced radially outwardly from said spherical bearing surface, and (b) has a radially outwardly extending projection which engages said radial cavity thereby retaining said liner in said recess.

7. A ball joint according to claim 6, wherein said projection has part of its radially outer surface inclined at an acute angle to the external surface of the liner in a direction away from the axis of the annulus and towards the central plane thereof.

8. A ball joint according to claim 7, wherein said projection of said liner has another part of its radially outer surface inclined in the opposite direction such that said projection is wedged-shaped in axial cross-section.

9. A ball joint according to claim 6, wherein the other end portion of the annulus has a plurality of axially extending circumferentially spaced tongues the inner surfaces of which lie in the spherical bearing surface.

10. A ball joint according to claim 6, wherein said liner has tongues on each end portion disposed relative to each other so that dilation of one end of the annulus produces a contraction in the other end of the annulus.

* * * * *